UNITED STATES PATENT OFFICE.

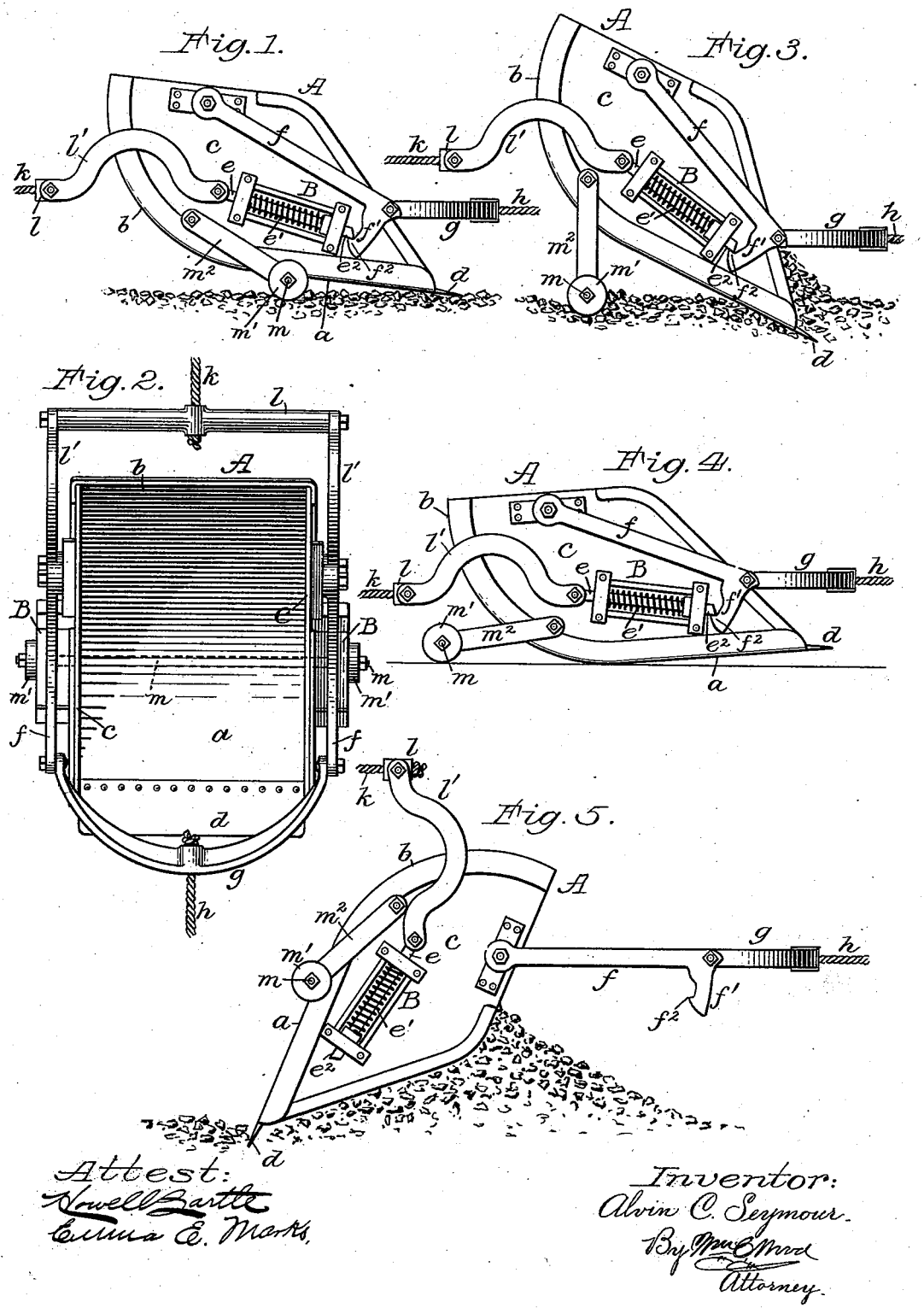

ALVIN C. SEYMOUR, OF WARREN, RHODE ISLAND.

TRAVELING SCOOP OR SHOVEL.

SPECIFICATION forming part of Letters Patent No. 550,199, dated November 19, 1895.

Application filed April 19, 1894. Serial No. 508,137. (No model.)

*To all whom it may concern:*

Be it known that I, ALVIN C. SEYMOUR, of Warren, in the county of Bristol and State of Rhode Island, have invented certain new and useful Improvements in Traveling Scoops or Shovels; and I do hereby declare that the following specification, taken in connection with the drawings furnished and forming a part of the same, is a clear, true, and complete description of my invention.

My said improvements pertain to that class of scoops or shovels which are operated by power applied by means of windlasses and chains or ropes, so as to cause the scoop or shovel to travel unloaded in one direction, and when started on the return movement to load from the underlying material—such as coal, ore, sand, &c.—and to then carry the load to a desired point for delivery by dumping. Scoops or shovels of this general class have heretofore been devised and patented in great variety of construction and arrangement; but I know of none prior to my invention that afforded that degree of control by way of the in-and-out chains or ropes that I have found to be specially important in the working of cargoes of coal to be discharged by means of elevators.

The objects of my invention are to provide for an easy, smooth, rearward or back hauling draft of the scoop or shovel over a mass of coal; to provide for assuming promptly an effective loading position at the initial forward movements; to provide for securely carrying the load with but little liability of spilling to the point of discharge; to promptly and effectively control dumping at any desired point by way of the backhaul line or chain or by means of a separate line, and, finally, to promptly restore the shovel after dumping to its proper position for backhauling.

To these ends I have so organized my shovel that the backhauling line or chain is caused to vary its draft-line with respect of the bottom and top of the shovel; also, so that the backhauling-line performs its duty within the power of a spring, the normal tension of which is greater than the force required for backhauling; also, so that when the power applied by said backhauling-line overcomes the power of said spring an outhauling locking-latch is released, so that the outhauling-line shall have two separate lines of draft with respect of the shovel, one by way of the latch referred to a little above the plane of the shovel-lip, as while loading, and also while doing carrying duty, and the other from a point or points near the top of the shovel, as in dumping, and also so that after dumping the draft on the backhaul line or chain will not only restore the shovel to its proper backhauling position, but operate the locking-latch for restoring the normal line of draft, as between the outhauling-line and the shovel.

I have still further provided the shovel with a tail-beam, which when the shovel is moving rearwardly trails beneath it; but which serves as a supporting-strut or shifting-brace during the tilting movement of the shovel while in the act of loading.

To more particularly describe my invention, I will refer to the accompanying drawings, in which—

Figures 1 and 2, respectively, illustrate one of my shovels in side elevation and top view. Fig. 3 illustrates the same as when in the act of loading. Fig. 4 illustrates the same as when loaded and traveling to the dumping-point. Fig. 5 illustrates the same in the act of dumping.

The shovel A is usually composed of heavy steel plates and so constructed as to afford a flat bottom $a$, a rounded back $b$, and straight sides $c\ c$, the front edge of the bottom being provided with a hardened blade or lip $d$, projecting beyond the sides $c\ c$.

While the form indicated has been proved to be specially effective, it is to be understood that it can be widely varied without departure from my invention.

At each of its sides the shovel is provided externally with a spring-latch B, consisting of a sliding latch-bolt $e$ and a spiral spring $e'$ of such expansive power in this instance that the bolt cannot be retracted except upon the application of a greater force than will ever be requisite for hauling the empty shovel rearwardly. This latch-bolt is located well below the cross-center of the shovel and near the bottom, and the latch-face $e^2$ is projected toward the lip of the shovel.

Near the tops of the sides of the shovel and centrally thereon a pair of outhauling latch-links $f\ f$ are pivoted, each having at their outer end a pendent arm $f'$, provided with a latch-keeper $f^2$, with which the latch-face $e^2$ of the bolt $e$ is normally engaged. These two latch-links $f f$ are pivotally coupled at their outer ends to a cross-yoke $g$, to the center of which the outhauling line or chain $h$ is attached.

As thus far described, it will be seen that the outhauling-line can operate under two lines of draft with respect of the shovel—i. e., first normally in one line, when the latch-links are engaged by the latch-bolt, and, secondly, in another line, when said latch-links are released—and this is a valuable feature of my invention, regardless of the manner in which this release may be effected. In other words, the spring $e'$ may be only heavy enough to properly actuate and control the bolt and then be actuated by means of a separate hand-line, or said spring may be a heavy one and arranged to be actuated by means of power applied to the line $h$, with resistance afforded by the back line $k$, or by power applied to the backhauling-line, with resistance at the outhauling-line, as will next be described. The backhauling-line $k$ in the preferred organization, as here shown, is connected with the shovel by means of a cross-bar $l$ and two backhauling side links $l' l'$, each of which is pivoted or flexibly connected to the rear end of its appropriate latch-bolt $e$. The spring $e'$, being heavy, does not yield under such strains as are required for pulling the shovel rearwardly, and hence no release of the latch-links $f f$ can occur except when power is applied to both lines or to either, while the other is made to offer the required resistance. If, however, the backhauling-links $l' l'$ were directly pivoted to the sides of the shovel, the latch bolt or bolts would then be provided with a releasing-line common to both bolts, if two were used, so that dumping could be effected at any time and place during the forward movement of the shovel without regard to varying the strains on either the outhauling or the backhauling-line.

For enabling the shovel to promptly dip and bury its lip or blade $d$ into a mass of coal, &c., a tail-beam is pivoted to the rear part of the shovel. This tail-beam consists of a cross-bar $m$, having flat-faced wheels $m' m'$ at its two ends, and a pair of arms $m^2 m^2$, which are pivoted to the sides of the shovel near the junction of its back and bottom and also coupled to the cross-bar $m$, as clearly indicated.

Now, referring to Fig. 1, it will be understood that the shovel is about to begin its initial forward movement. Draft on the outhauling-line $h$ causes the wheels $m' m'$ and the cross-bar $m$ to be thrust into the coal, &c., and then the arms $m^2 m^2$ serve as struts or lifting-braces until, as shown in Fig. 3, the lip of the shovel is well buried. A further forward movement necessarily fills the shovel, and the tail-beam swings to the rear, as shown in Fig. 4, the shovel then traveling forwardly. Whenever the desired dumping-point has been reached, the inhauling-line $k$ is arrested, force being still applied to the line $n$, thus causing the latch $e$ to release the latch-links $f' f'$, and by thus changing the line of draft of the outhauling-line $h$ the shovel is turned and caused to dump its load, as illustrated in Fig. 5. Force being next applied to the inhauling-line $k$, the shovel tilts rearwardly, the latch bolt and links become re-engaged, and the shovel travels rearwardly in position, as shown in Fig. 1, with the tail-beam set for the next loading operation.

It will be seen when the shovel occupies its dumping position, as in Fig. 5, that the side links $l' l'$, near their pivoted ends, abut against the tail-beam arms $m^2$, so that the latter, near their pivoted ends, serve as stops for the side links $l' l'$, causing the latter to occupy a practically vertical position, and enabling the backhauling-line to promptly tip the shovel rearwardly. Should no tail-beam be used, stops would then be afforded by means of lugs or pins appropriately located on the sides of the shovel.

While two latch-bolts will generally be desirable, one can be relied upon, if a separate releasing-line be used or if the opposite backhauling-link is provided with a yielding connection with the shovel corresponding with the spring $e'$.

Having thus described my invention, I claim as new and desire to secure by Letters Patent—

1. The combination with a traveling scoop or shovel, of a latch bolt, coupled with a backhauling line, and a latch link or links which are coupled with an outhauling line, and are pivoted to the shovel near its top, and normally locked by the bolt near the bottom of the shovel, and afford variations in the line of draft in carrying and dumping, substantially as and for the purposes specified.

2. The combination with a traveling scoop or shovel, of back hauling links flexibly secured to the sides of the shovel, and a stop or stops which restrict said links to a vertical position, after the dumping movement of the shovel, substantially as and for the purposes described.

3. The combination with a traveling scoop or shovel and means for affording variations in the line of draft as between an outhauling line and the shovel, of a tail-beam which serves as a strut or brace during the initial forward or filling movement of the shovel, and which trails beneath the shovel during its rearward movements, substantially as described.

ALVIN C. SEYMOUR.

Witnesses:
E. HIBBERTS,
J. T. BUTTERWORTH.